United States Patent
Goss et al.

[11] Patent Number: 6,158,310
[45] Date of Patent: Dec. 12, 2000

[54] DRIVE SYSTEM HAVING A STRENGTHENED DRIVE SYSTEM MEMBER FOR RESISTING TORSIONAL STRESSES

[75] Inventors: David C. Goss, Rockford, Ill.; Terry A. Crissinger, Rochester, Ind.

[73] Assignee: Textron Inc., Providence, R.I.

[21] Appl. No.: 09/317,415

[22] Filed: May 24, 1999

[51] Int. Cl.⁷ .................................................. B25B 13/06
[52] U.S. Cl. .................... 81/121.1; 81/124.6; 81/186; 411/402; 411/418
[58] Field of Search ................................ 411/402, 403, 411/388, 389, 417, 418; 81/121.1, 124.6, 124.7, 186

[56] References Cited

U.S. PATENT DOCUMENTS

| | | | |
|---|---|---|---|
| 2,741,289 | 4/1956 | Grow | 411/389 |
| 3,128,483 | 4/1964 | Moore | 411/417 |
| 3,482,481 | 12/1969 | Newell | 411/402 |
| 3,584,667 | 6/1971 | Reiland . | |
| 3,763,725 | 10/1973 | Reiland . | |
| 4,235,149 | 11/1980 | Veldman | 411/417 |
| 4,269,246 | 5/1981 | Larson et al. . | |
| 4,492,500 | 1/1985 | Ewing | 411/402 |
| 4,690,365 | 9/1987 | Miller | 411/389 |
| 4,973,209 | 11/1990 | Essom | 411/417 |
| 5,019,080 | 5/1991 | Hemer . | |
| 5,171,117 | 12/1992 | Seidl . | |
| 5,207,132 | 5/1993 | Goss et al. . | |
| 5,279,190 | 1/1994 | Goss et al. . | |
| 5,291,811 | 3/1994 | Goss . | |
| 5,461,952 | 10/1995 | Goss . | |

*Primary Examiner*—Flemming Saether
*Attorney, Agent, or Firm*—Trexler, Bushnell, Giangiorgi & Blackstone, Ltd.

[57] ABSTRACT

A novel drive system includes a body, such as a threaded fastener body or a drive tool body, a tapered transitional portion at an end of the body, and a drive head at the end of the transitional portion, such that the transitional portion is between the drive head and the body. The transitional portion has structure thereon, such as a plurality of alternating curved lobes and flutes, for engagement with a corresponding socket. At least a portion of the lobes are threaded in the transitional portion. The drive head also has structure thereon for engagement with the socket, such as a plurality of alternating curved lobes and flutes. The flutes on the transitional portion are axially aligned with the flutes on the drive head and the lobes on the transitional portion are axially aligned with the lobes on the drive head.

23 Claims, 6 Drawing Sheets

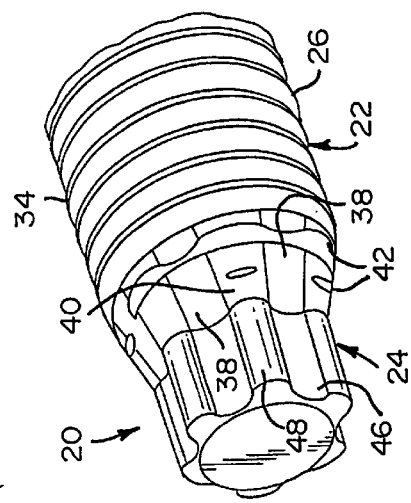
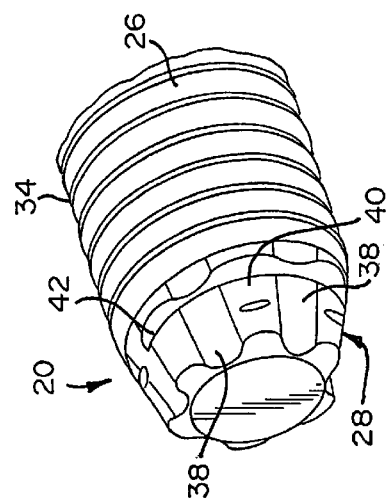
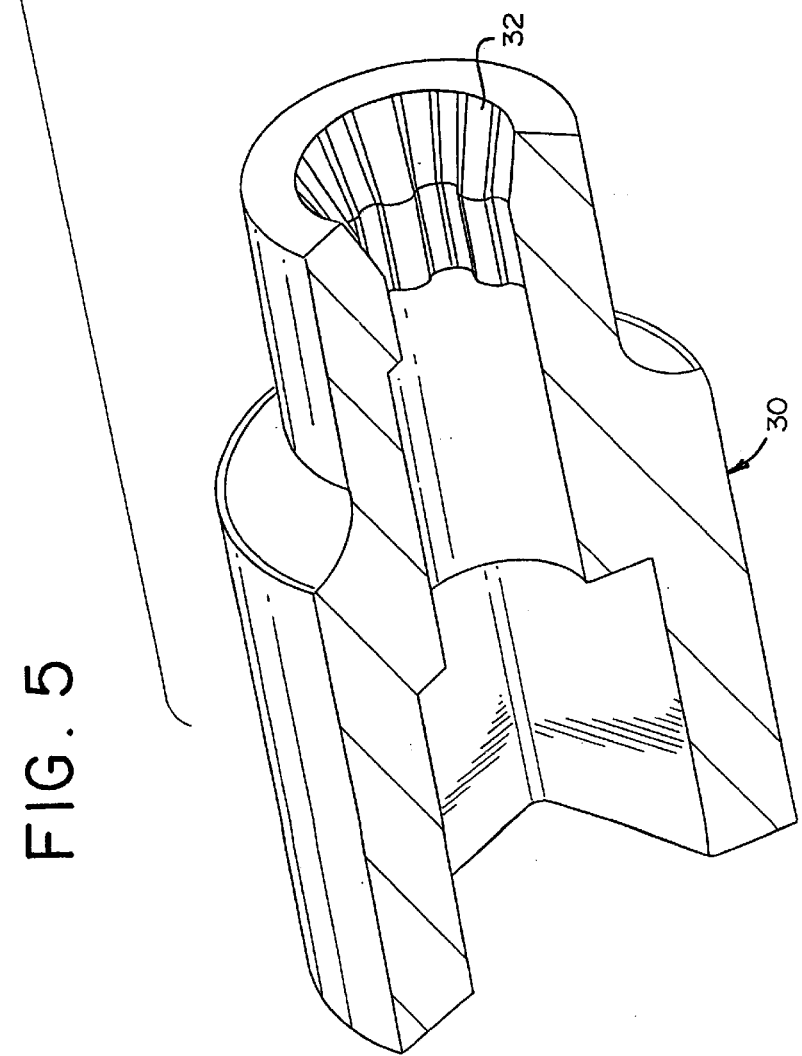

6,158,310

DRIVE SYSTEM HAVING A STRENGTHENED DRIVE SYSTEM MEMBER FOR RESISTING TORSIONAL STRESSES

BACKGROUND OF THE INVENTION

This invention is generally directed to a novel drive system which provides increased resistance to torsional stresses imposed on the drive system of a headed stud. More particularly, the invention contemplates a novel drive system which provides for increased strength to resist torsional shearing between a drive head and a stud body by providing a novel transitional portion between the drive head and the body.

Prior art studs have been formed with drive heads on a drive end thereof. For example, using a TORX® drive head, the male portion of the drive head is formed on a free end of the stud. The crest of the TORX® drive head has previously, necessarily, been formed with a diameter which is less than the diameter of the thread root formed on the body of the stud in order to prevent forming a thread on the lobes of the TORX® drive head. The TORX® drive head can shear off the stud as a result of the torsional stresses imposed on the drive head being greater than the strength of the material between the drive head and the body of the stud.

The present invention provides a novel drive structure which improves the prior structure to provide further resistance to torsional shearing of the drive head from the stud body by providing a transitional portion between the drive head and the body of the stud. Other features and advantages of the present invention will become apparent upon a reading of the attached specification in combination with a study of the drawings.

OBJECTS AND SUMMARY OF THE INVENTION

A general object of the present invention is to provide a novel drive system which provides increased resistance to torsional stresses imposed on the drive system of a headed stud.

An object of the present invention is to provide a novel drive system which provides for increased strength to resist torsional shearing between a drive head and a stud body by providing a novel transitional portion between the drive head and the body.

Another object of the present invention is to provide a drive system which when engaged within a socket, the net effective cross-sectional area and ultimate torsional strength is increased by shifting the potential fracture location to the transitional portion.

A further object of the present invention to provide a drive system which when engaged with a socket provides for a greater engagement between the socket and the fastener over that which is provided in prior art structures.

Briefly, and in accordance with the foregoing, the present invention discloses a drive system which includes a body, such as a threaded fastener body or a drive tool body, a tapered transitional portion at an end of the body, and a drive head at the end of the transitional portion, such that the transitional portion is between the drive head and the body. The transitional portion has structure thereon, such as a plurality of alternating curved lobes and flutes, for engagement with a corresponding socket. A portion of the flutes and a portion of the lobes are threaded in the transitional portion. The drive head also has structure thereon for engagement with the socket, such as a plurality of alternating curved lobes and flutes. The flutes on the transitional portion are axially aligned with the flutes on the drive head and the lobes on the transitional portion are axially aligned with the lobes on the drive head.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 5 is an exploded perspective view of a drive end of a fastener and a drive tool, such drive tool being shown partially in cross-section, wherein the fastener incorporates the features of a second embodiment of the invention;

FIG. 9 is a perspective view of a fastener and which incorporates the features of a third embodiment of the invention.

DETAILED DESCRIPTION OF THE ILLUSTRATED EMBODIMENT

Figure 1:
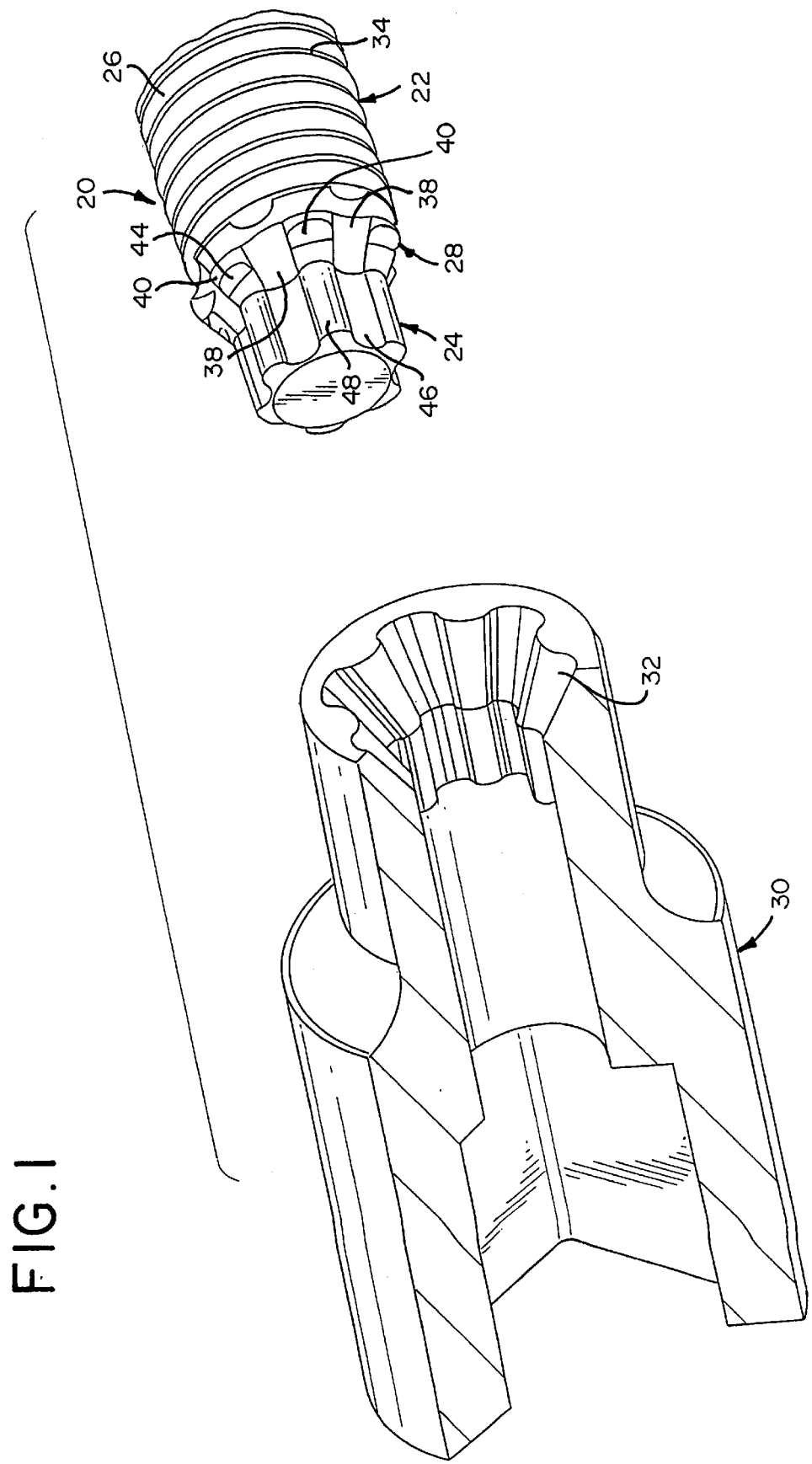
FIG. 1 is an exploded perspective view of a drive end of a fastener and a drive tool, such drive tool being shown partially in cross-section, wherein the fastener incorporates the features of a first embodiment of the invention.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

The present invention provides a novel drive system 20. The drive system 20 is provided as a headed stud and is described with respect to and is shown in the drawings as a fastener 22. It is to be noted, however, that the invention may be used in any torque transmission or torque coupling application, wherein a driving unit is employed to transmit torque to a complementary shaped driven unit.

Figure 2:
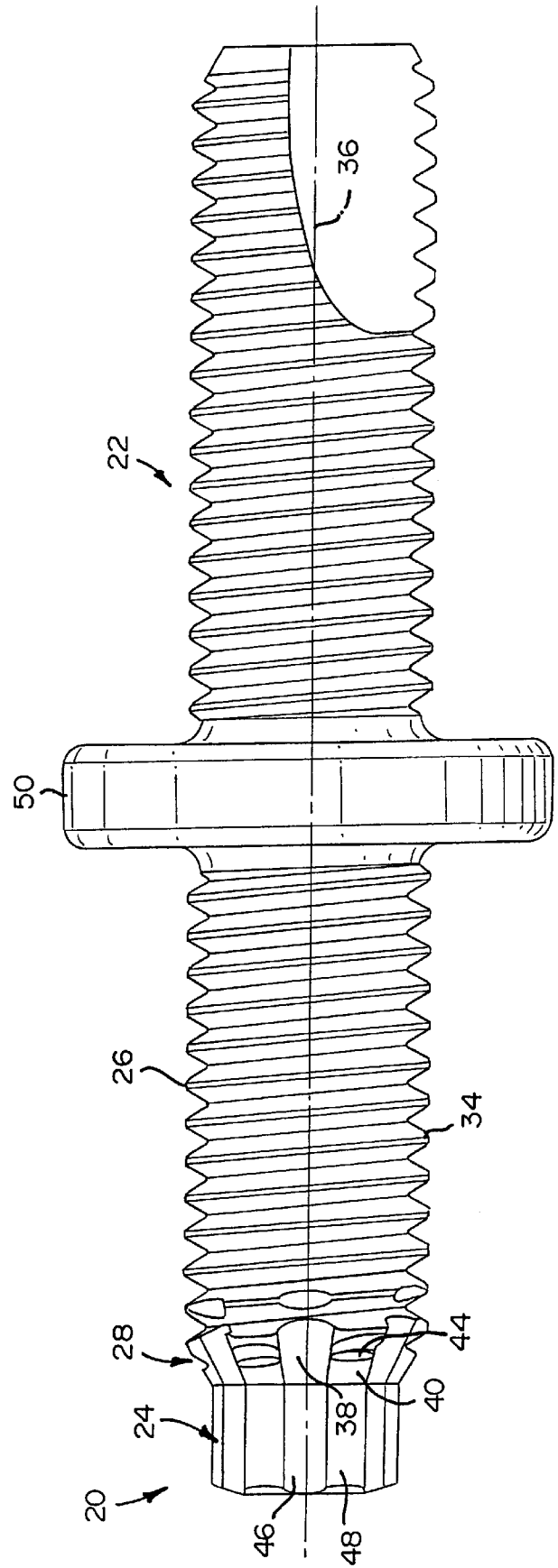
FIG. 2 is a side elevational view of the fastener of FIG. 1.
Figure 3:
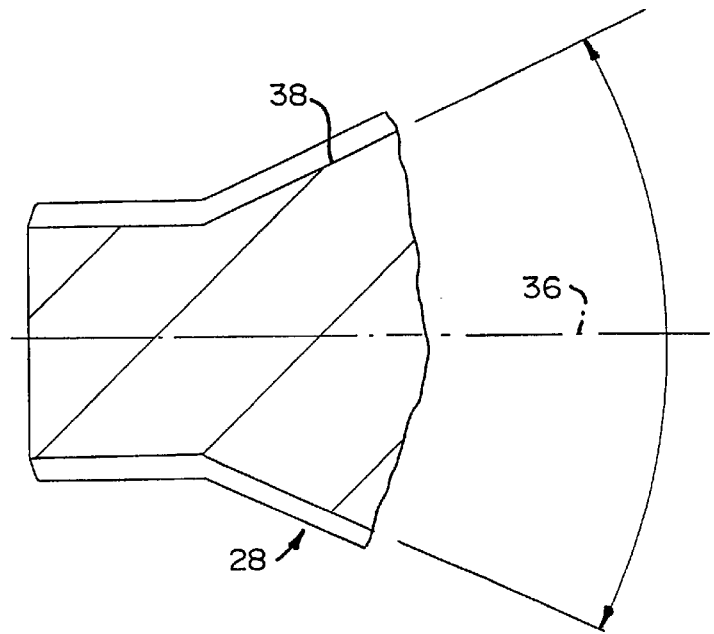
FIG. 3 is a cross-sectional view of the drive end of the fastener of FIG. 1.
Figure 4:
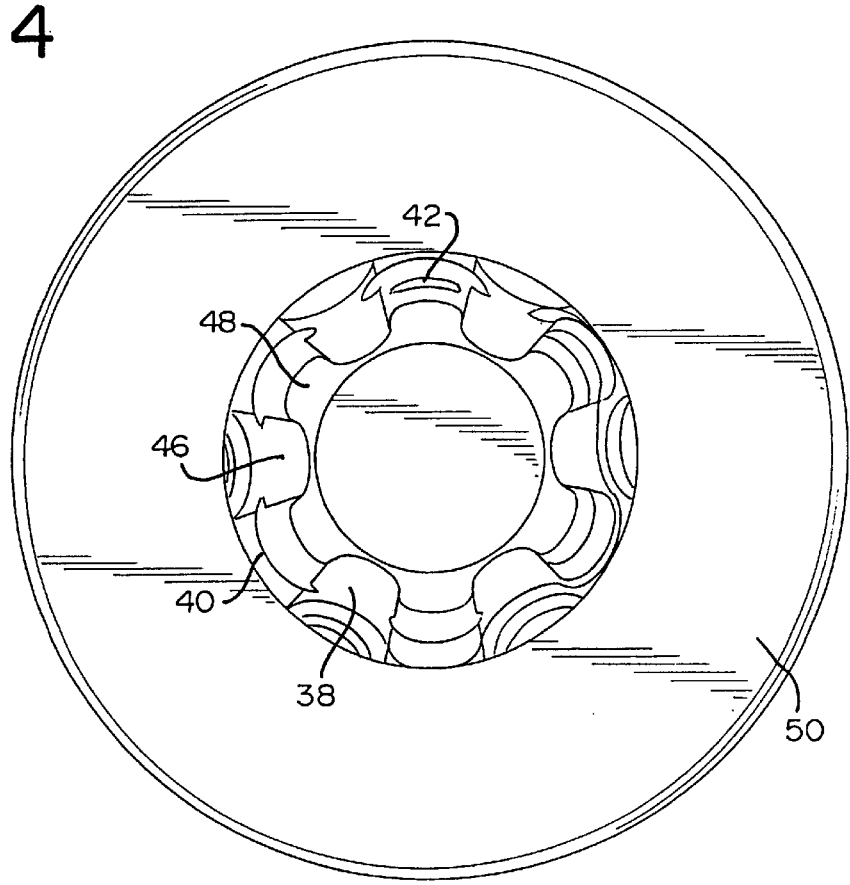
FIG. 4 is an front plan view of the fastener of FIG. 1.
Figure 6:
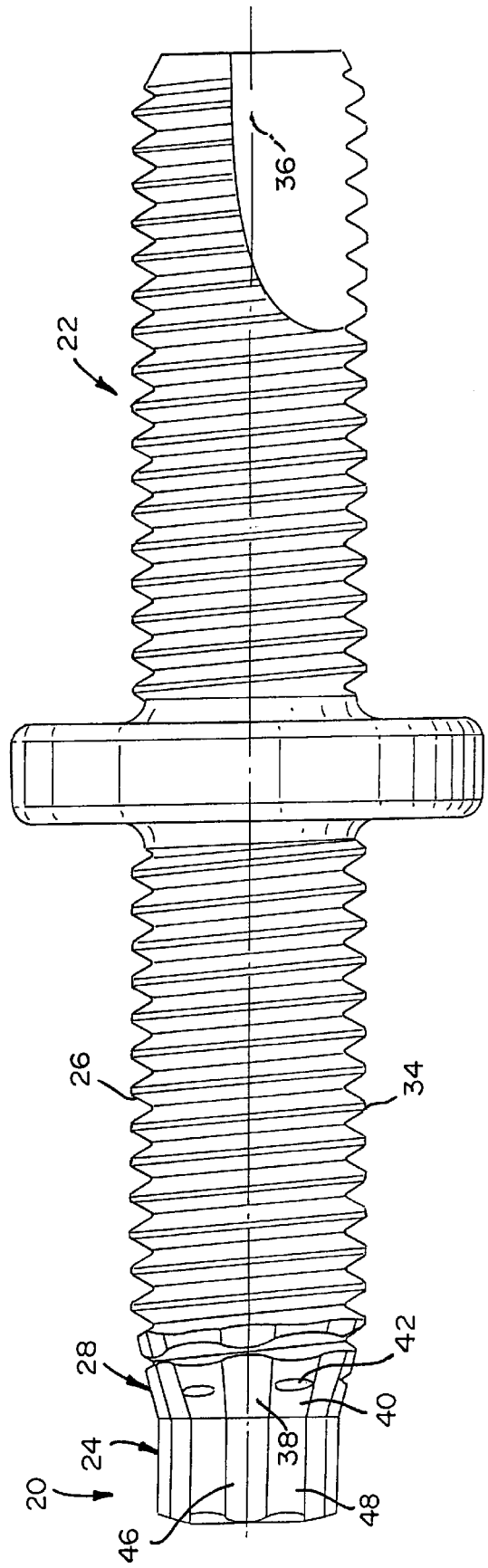
FIG. 6 is a side elevational view of the fastener of FIG. 5.
Figure 7:
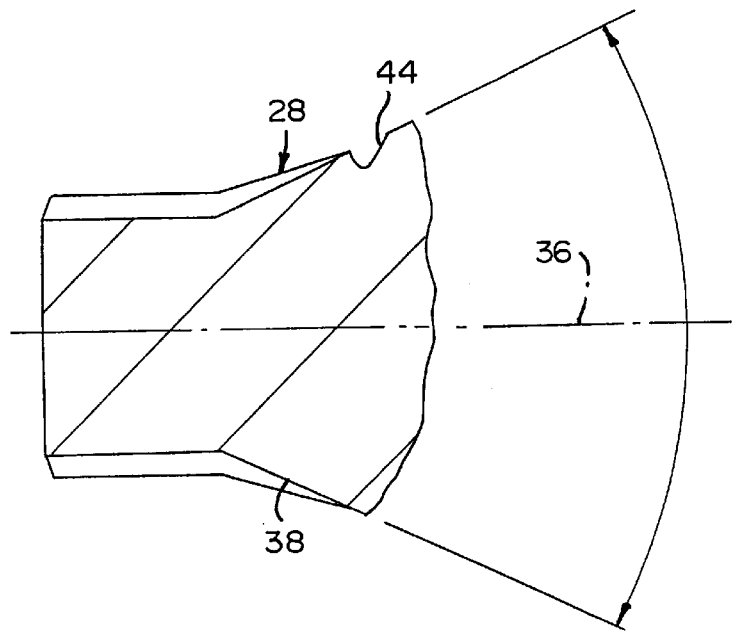
FIG. 7 is a cross-sectional view of the drive end of the fastener of FIG. 5.
Figure 8:
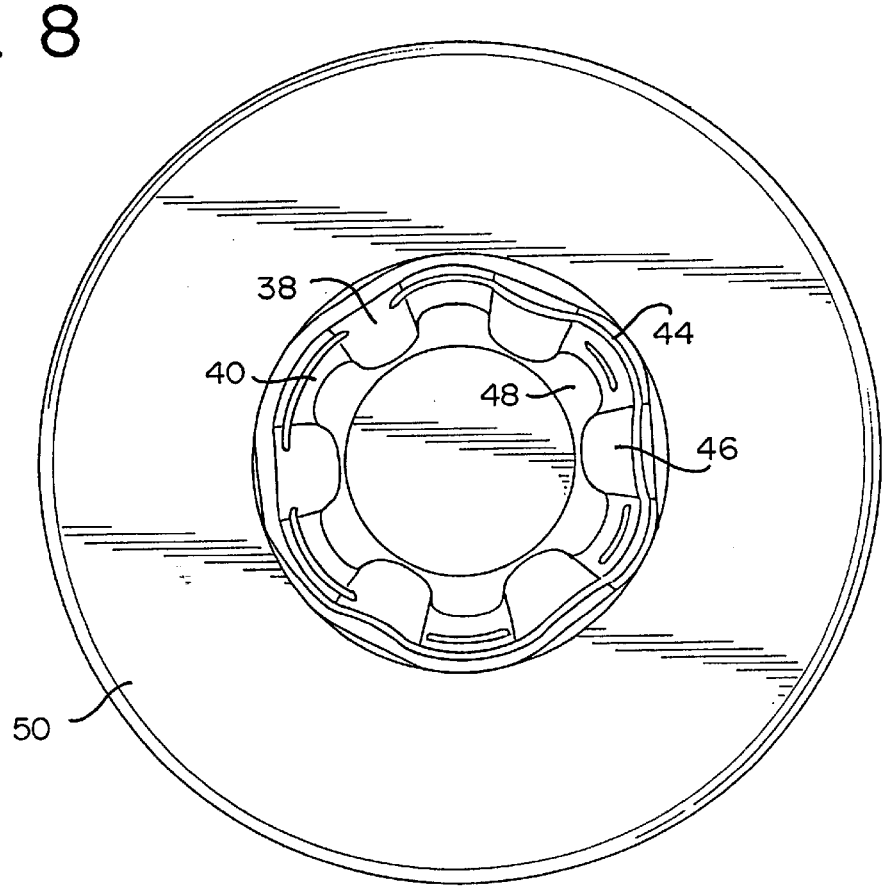
FIG. 8 is an front plan view of the fastener of FIG. 5.

A first embodiment of the drive system 20 is shown in FIGS. 1–4. A second embodiment of the drive system 20 is shown in FIGS. 5–8. In each of these embodiments, the drive system 20 provides for increased strength to resist torsional shearing between a drive head 24 and an elongate body 26 by providing a novel transitional portion 28 between the drive head 24 and the body 26. A third embodiment of the drive system 20 is illustrated in FIG. 9. In this third embodiment, the drive head is eliminated.

The fastener 22 and drive tool 30 arrangement shown in the drawings illustrate a particular application of the invention wherein the fastener 22 is provided with the drive head 24 and transitional portion 28 having an external configuration formed in accordance with the principles of the present invention, while the complementary drive tool 30 is provided with a socket 32 having a complimentary internal configuration which receives the external configuration provided on the fastener 22. Those skilled in the art will readily realize that this situation can be reversed such that the drive tool 30 would employ the external configuration in accordance with the present invention while the fastener 22 would include the socket 32 having the complimentary internal configuration.

The elongate body 26 has a thread 34 formed thereon and defines a centerline or center axis 36 of the fastener 22. The transitional portion 28 is provided on the end of the body 26. The drive head 24 is unthreaded and is provided on the free end of the transitional portion 28.

The transitional portion 28 has first and second opposite ends, with the second end connected to the end of the body 26. The transitional portion 28 tapers from its first end to its second end and has a first series of sections 38 and a second series of sections 40 alternating around the circumference thereof. That is, working the way around the circumference of the transitional portion 28, a section 38 is encountered, then section 40 is encountered, then section 38 is encountered, then section 40 is encountered, and so on around the circumference of the transitional portion 28.

The first series of sections 38 and the second series of sections 40 extend in the axial direction along the length of the transitional portion 28. Each section 38, as shown in the drawings, takes the form of a flute 38 formed from a curved surface which is directed radially inwardly toward the centerline 36 of the fastener 22. Each section 40, as shown in the drawings, takes the form of a lobe 40 formed from a curved surface which is directed radially outwardly from the centerline 36 of the fastener 22. As such, the flutes 38 are recessed toward the centerline 36 of the fastener 22 relative to the lobes 40. Adjacent curved surfaces which forms the respective flutes 38 and lobes 40 merge generally tangentially and smoothly with each other.

The configuration of alternating flutes 38 and lobes 40 define the external configuration of the transitional portion 28. The flutes 38 and lobes 40 are equally spaced around the circumference of the transitional portion 28 and in the illustrated embodiment, six flutes 38 are provided in the first series and six lobes 40 are provided in the second series.

Attention is directed to the first embodiment of the transitional portion 28 shown in FIGS. 1–4. The flutes 38 and the lobes 40 taper from the first end to the second end of the transitional portion 28 at the same angle relative to the centerline 36 of the fastener 22, see FIG. 3. A portion of each flute 38 proximate to the second end of the transitional portion 28 is threaded with at least one thread 42. A portion of each lobe 40 proximate to the second end of the transitional portion 28 is threaded with at least one thread 42. The thread(s) 42 on the flutes 38 and on the lobes 40 run in alignment with each other and with the threads 34 formed on the body 26 as the threads 34, 42 are formed on the body 26 and on the lobes 40 of the transitional portion 28 in a conventional thread roll forming operation as described herein. Only the portions of the flutes 38 and the lobes 40 which have the same diameter as the thread 34 root on the body 26 are threaded.

Attention is directed to the second embodiment of the transitional portion 28 shown in FIGS. 5–8. The flutes 38 taper from the first end to the second end of the transitional portion 28 at an angle relative to the centerline 36 of the fastener 22 which is greater than the angle at which the lobes 40 taper from the first end to the second end of the transitional portion 28, see FIG. 7. A portion of each flute 38 proximate to the second end of the transitional portion 28 is threaded with at least one thread 42. A portion of each lobe 40 proximate to the second end of the transitional portion 28 is threaded with at least one thread 42. The thread(s) 42 on the flutes 38 and on the lobes 40 run in alignment with each other and with the threads 34 formed on the body 26 as the threads 34, 42 are formed on the body 26 and on the lobes 40 of the transitional portion 28 in a conventional thread roll forming operation as described herein. Only the portions of the flutes 38 and the lobes 40 which have the same diameter as the thread 34 root on the body 26 are threaded. The thread 42 formed on the flutes 38 and the lobes 40 is continuous for a predetermined distance until the respective flutes 38 have a height which is below the thread 34 root on the body 26.

In each of the first and second embodiments, the drive head 24 has a means for engaging or an external configuration which is defined by a first series of sections 46 and a second series of sections 48 alternating around the circumference thereof. That is, working the way around the circumference of the drive head 24, a section 46 is encountered, then section 48 is encountered, then section 46 is encountered, then section 48 is encountered, and so on around the circumference of the drive head 24.

The first series of sections 46 and the second series of sections 48 extend in the axial direction along the length of the drive head 24. Each section 46, as shown in the drawings, takes the form of an unthreaded flute 46 formed from a curved surface which is directed radially inwardly toward the centerline 36 of the fastener 22 and which is generated by an ellipse. The center of each ellipse which is used to form the respective flutes 46 is radially equidistant from the centerline 36 of the fastener 22. Each section 48, as shown in the drawings, takes the form of an unthreaded lobe 48 formed from a curved surface which is directed radially outwardly from the centerline 36 of the fastener 22 and which is generated by an ellipse. The center of each ellipse which is used to form the respective lobes 48 is radially equidistant from the centerline 36 of the fastener 22. As such, the flutes 46 are recessed toward the centerline 36 of the fastener 22 relative to the lobes 48. Adjacent curved surfaces which forms the respective flutes 46 and lobes 48 merge generally tangentially and smoothly with each other. The configuration of alternating flutes 46 and lobes 48 define the external configuration of the drive head 24. The flutes 46 and lobes 48 are equally spaced around the circumference of the drive head 24 and in the illustrated embodiment, six flutes 46 are provided in the first series and six lobes 48 are provided in the second series. The centers of the ellipses used to form the flutes 46 define a circle with respect to the centerline 36 of the fastener 22 and the centers of the ellipses used to form the lobes 48 define a circle with respect to the centerline 36 of the fastener 22. These circles may overlap each other or may be offset from each other. Specifics of the geometry of the flutes 46 and the lobes 48 as provided on the drive head 24 is described in U.S. Pat. Nos. 5,207,132 and 5,279,190, each of which is commonly owned by the present assignee and each of which disclosure is herein incorporated by reference.

Each flute 46 on the drive head 24 is axially aligned with a respective flute 38 on the transitional portion 28. Each lobe 48 on the drive head 24 is axially aligned with a respective lobe 40 on the transitional portion 28. The axially aligned flutes 46 and lobes 48 on the drive head 24 and flutes 38 and lobes 40 on the transitional portion 28 are sized to prevent interfering with a nut 50 placed over and engaged with the threads 42 or 44 on the transitional portion 28 and on the body 26.

The socket 32 in the drive tool 30 is of a complementary, although not completely identical shape, to the drive head 24 and transitional portion 28 of the fastener 22 and is thus engagable therewith such that the drive tool 30 can impart driving forces to the fastener 22. The socket 32 is unthreaded. In order for the socket 32 in the drive tool 30 to be able to easily receive the drive head 24 and transitional portion 28 of the fastener 22 and yet be effective when in driving engagement, the lobes and the flutes in the socket 32 must be dimensioned for a clearance fit. Also, in order to attain the desired driving engagement and depth of engagement between the mating lobes and flutes, the shape of the socket 32 must be altered slightly so that the lobes 40 are received within the flutes of the socket 32 to a specific extent and correspondingly the lobes of the socket 32 are received within the flutes 38 of the fastener 22, in order to attain a desired depth of engagement between the respective lobes and flutes.

When the drive head 24 and the transitional portion 28 are engaged within the socket 32, the net effective cross-sectional area and ultimate torsional strength is increased by shifting the potential fracture location to the transitional portion 28 as a result of extending the flutes 46 and the lobes 48 of the drive head 24 along the transitional portion 28 thereby forming the flutes 38 and lobes 40. The engagement of the transitional portion 28 within the socket 32 provides for a greater engagement between the fastener 22 and the socket 32 over that which is provided in prior art structures.

In addition, the provision of the flutes 38 and the lobes 40 on the transitional portion 28 provides a horizontal loading component. In this regard, when an end load is applied to the drive head 24 and the transitional portion 28 by the drive tool 30, a portion of the end load is applied to the transitional portion 28 converting the end load into a horizontal vector component. As such, engagement results along the sides of the axially aligned lobes and flutes on the drive head 24 and in the socket 32, and forces are applied to the flute root in the transitional portion 28 defining a horizontal vector component.

To form the fastener 22 in accordance with the first or second embodiments of the invention, the body 26, the transitional portion 28 and the drive head 24 are formed. Thereafter, a generally planar thread rolling die is used to form the threads 34 and 42 or 44 (depending on which embodiment is being formed) thereon in accordance with known thread rolling teaching. Threads 42 or 44 are partially formed in the transitional portion 38 as a result of the thread rolling die and the thread forming grooves thereon extending into the transitional portion 28. The threads 42 or 44 formed on the transitional portion 28 have a root diameter which is slightly greater than the lobe 48 crest of the axially aligned lobes 48 of the drive head 24. Only the portions of the flutes 38 and the lobes 40 which have the same diameter as the thread 34 root on the body 26 are threaded.

Attention is now directed to FIG. 9 which illustrates the third embodiment of the invention. In this embodiment, the axially extending drive head 24 is eliminated. The transitional portion 28 is formed on the free end of the body 26 and directly transitions into the body 26. Either embodiment of the transitional portion 28 can be provided in this embodiment. The unthreaded socket (not shown) on the drive tool (not shown) is of a complementary, although not completely identical shape, to the transitional portion 28 of the fastener 22 and is thus engagable therewith such that the drive tool 30 can impart driving forces to the fastener 22.

To form the fastener 22 in accordance with the third embodiment of the invention, the body 26 and the transitional portion 28 are formed. Thereafter, a generally planar thread rolling die is used to form the threads 42 or 44 (depending on which embodiment is being formed) thereon in accordance with known thread rolling teaching. Threads 42 or 44 are partially formed in the transitional portion 38 as a result of the thread rolling die and the thread forming grooves thereon extending into the transitional portion 28. Only the portions of the flutes 38 and the lobes 40 which have the same diameter as the thread 34 root on the body 26 are threaded.

As one of ordinary skill in the art would recognize, the present invention is not limited to a lobular design. Any engaging configuration provided on the drive head 24 can be extended into the transitional portion 28. For example, a hex, a square could be provided.

While preferred embodiments of the present invention are shown and described, it is envisioned that those skilled in the art may devise various modifications of the present invention without departing from the spirit and scope of the appended claims.

The invention claimed is:

1. A drive system comprising: a fastener member and a drive tool member, one of said members comprising a body, and a transitional portion at an end of said body for engagement with the other of said members, said transitional portion tapering from a first end thereof to a second end thereof, said transitional portion having a plurality of lobes and a plurality of flutes alternating around a circumference of said transitional portion, said lobes being at least partially threaded, said flutes having a first portion being threaded and a second portion being below a root diameter of the thread on said lobes such that said second portion of each said flute is unthreaded.

2. A drive system as defined in claim 1, wherein said flutes taper from said first end to said second end at an angle which is the same as an angle at which said lobes taper from said first end to said second end.

3. A drive system as defined in claim 1, wherein said flutes taper from said first end to said second end at an angle which is greater than an angle at which said lobes taper from said first end to said second end.

4. A drive system as defined in claim 1, further including an unthreaded drive head extending from said first end of said transitional portion, said drive head having means for engaging a socket formed on outer surface thereof.

5. A drive system as defined in claim 1, wherein said lobes define a predetermined crest diameter at said second end of said transitional portion, and said flutes define a predetermined minimum diameter at said second end of said transitional portion, said crest diameter being larger than said minimum diameter.

6. A drive system as defined in claim 5, further including an unthreaded drive head attached to said first end of said transitional portion, said drive head having means for engaging a socket on an outer surface thereof.

7. A drive system as defined in claim 6, wherein said body is threaded.

8. A drive system as defined in claim 1, wherein said flutes are curved radially inwardly with respect to a centerline of said body.

9. A drive system as defined in claim 8, wherein said are curved radially outwardly with respect to said centerline of said body.

10. A drive system as defined in claim 9, wherein said body is threaded.

11. A drive system member comprising: a body; a transitional portion at an end of said body, said transitional portion tapering from a first end thereof to a second end thereof, said transitional poition having a plurality of first sections and a plurality of second sections, said second sections being at least partially threaded, said first and second sections alternating around a circumference of said transitional portion; and an unthreaded drive head extending from said first end of said transitional portion, said drive head having means for engaging a socket formed on outer surface thereof, said engaging means comprising a plurality of first end sections defining a first diameter and a plurality of second end sections defining a second diameter, said diameter of said second end sections being greater than said diameter of said first end sections, said first end sections of said drive head being axially aligned with said first sections of said transitional portion.

12. A drive system member as defined in claim 11, wherein each said first end section is curved radially inwardly with respect to a centerline of said body, and each said second end section is curved radially outwardly with respect to said centerline of said body.

13. A drive system member as defined in claim 12, wherein said first sections of said transitional portion are curved radially inwardly with respect to a centerline of said body, and said second sections of said transitional portion are curved radially outwardly with respect to said centerline of said body.

14. A drive system member comprising: a body; a transitional portion at an end of said body, said transitional portion tapering from a first end thereof to a second end thereof, said transitional portion having a plurality of first sections and a plurality of second sections, said second sections being at least partially threaded, said first and second sections alternating around a circumference of said transitional portion, said first sections being curved radially inwardly with respect to a centerline of said body, said second sections being curved radially outwardly with respect to said centerline of said body; and an unthreaded drive head attached to said first end of said transitional portion, said drive head having a plurality of alternating curved surfaces, wherein adjacent curved surfaces are directed radially inwardly and radially outwardly with respect to said centerline of said body.

15. A method of forming a drive system member comprising the steps of:
forming a body having a transitional portion at an end thereof for engagement with a second member, said transitional portion tapering from a first end thereof to a second end thereof;
forming a plurality of lobes and a plurality of flutes on said transitional portion; and
rolling a thread form on said body and on at least a portion of said transitional portion using a threaded die such that at least a portion of said lobes are threaded and a first portion of said flutes is threaded and a second portion of said flutes is below a root diameter of the thread on said lobes such that said second portion of each said flute remains unthreaded.

16. A method as defined in claim 15, wherein said body further has a drive head formed thereon which extends from said first end of said transitional portion, and wherein in said thread rolling step, said drive head remains unthreaded.

17. A drive system member comprising: a body, a transitional portion at an end of said body, said transitional portion tapering from a first end thereof to a second end thereof and having a plurality of lobes and a plurality of flutes alternating around the circumference of said transitional portion, said lobes being at least partially threaded said flutes having a first portion being threaded and a second portion being below a root diameter of the thread on said lobes such that said second portion of each said flute is unthreaded.

18. A drive system member as defined in claim 17, wherein said flutes taper from said first end to said second end of said transitional portion at an angle which is the same as an angle at which said lobes taper from said first end to said second end of said transitional portion.

19. A drive system member as defined in claim 12, wherein said flutes taper from said first end to said second end of said transitional portion at an angle which is greater than an angle at which said lobes taper from said first end to said second end of said transitional portion.

20. A drive system member as defined in claim 12, wherein said body is threaded.

21. A drive system member as defined in claim 17, further including a drive head extending from said first end of said transitional portion, said drive head having means for engaging a socket formed on outer surface thereof.

22. A drive system member comprising: a body; a transitional portion at an end of said body, said transitional portion tapering from a first end thereof to a second end thereof and having a plurality of first sections and a plurality of second sections, said first and second sections alternating around the circumference of said transitional portion; and a drive head extending from said first end of said transitional portion, drive head having means for engaging a socket formed on outer surface thereof, said engaging means on said drive head comprises a plurality of first end sections defining a first diameter and a plurality of second end sections defining a second diameter, said diameter defined by second end sections being greater than said diameter defined by first end sections, each said first end section being axially aligned with a respective one of said first sections of said transitional portion.

23. A drive system member as defined in claim 22, wherein said first sections of said transitional portion and said first end sections of said drive head are curved radially inwardly with respect to a centerline of said body, and said second sections of said transitional portion and said second end sections of said drive head are curved radially outwardly with respect to said centerline of said body.

* * * * *

UNITED STATES PATENT AND TRADEMARK OFFICE
CERTIFICATE OF CORRECTION

PATENT NO. : 6,158,310
DATED : December 12, 2000
INVENTOR(S) : David C. Goss and Terry A. Crissinger It is certified that error appears in the above-identified patent and that said Letters Patent is hereby corrected as shown below:

Column 6,
Line 60, "said are" should be -- said lobes are --

Signed and Sealed this

First Day of January, 2002

Attest:

*Attesting Officer*

JAMES E. ROGAN
*Director of the United States Patent and Trademark Office*